(12) United States Patent
Bachmann et al.

(10) Patent No.: US 8,622,366 B2
(45) Date of Patent: Jan. 7, 2014

(54) MANUALLY OPERABLE DRIVE MODULE

(75) Inventors: Rene Bachmann, Grosserkmannsdorf (DE); Ulrike Brinkmann, Grosserkmannsdorf (DE); Kersten Grosse, Radebeul (DE)

(73) Assignee: Buerkert Werke GmbH, Ingelfingen (DE)

( * ) Notice: Subject to any disclaimer, the term of this patent is extended or adjusted under 35 U.S.C. 154(b) by 378 days.

(21) Appl. No.: 12/877,151

(22) Filed: Sep. 8, 2010

(65) Prior Publication Data

US 2011/0057131 A1   Mar. 10, 2011

(51) Int. Cl.
*F16K 31/08*  (2006.01)
*F16K 31/11*  (2006.01)
*F16K 31/02*  (2006.01)
*H01H 9/00*   (2006.01)

(52) U.S. Cl.
USPC .......... 251/62; 251/129.04; 251/65; 335/207; 60/409

(58) Field of Classification Search
USPC ................. 251/65, 129.04, 129.08, 62, 63.4; 335/205–207; 91/1, 527; 60/407, 409
See application file for complete search history.

(56) References Cited

U.S. PATENT DOCUMENTS

| | | | | |
|---|---|---|---|---|
| 2,788,070 A * | 4/1957 | Seabury, II et al. | ............. | 83/524 |
| 3,589,242 A * | 6/1971 | Peterson et al. | ................ | 91/523 |
| 4,091,627 A * | 5/1978 | Takahashi et al. | ............ | 405/302 |
| 4,156,422 A * | 5/1979 | Hildebrandt et al. | ......... | 600/561 |
| 4,481,389 A * | 11/1984 | Johnson | ...................... | 200/84 C |
| 4,540,400 A * | 9/1985 | Hooven | ........................... | 604/9 |
| 4,541,429 A * | 9/1985 | Prosl et al. | .................... | 604/249 |
| 4,559,037 A * | 12/1985 | Franetzki et al. | ............. | 604/151 |
| 4,595,390 A * | 6/1986 | Hakim et al. | ................. | 137/530 |
| 4,718,454 A * | 1/1988 | Appleby | ................... | 137/624.11 |
| 4,772,257 A * | 9/1988 | Hakim et al. | ............. | 251/129.11 |
| 4,805,404 A * | 2/1989 | Dupin | ............................ | 60/409 |
| 5,261,374 A * | 11/1993 | Gronenberg et al. | ......... | 123/436 |
| 5,349,993 A * | 9/1994 | Casey | ............................. | 141/94 |
| 5,551,953 A * | 9/1996 | Lattin et al. | ..................... | 604/20 |
| 5,637,083 A * | 6/1997 | Bertrand et al. | .................. | 604/9 |
| 5,643,194 A * | 7/1997 | Negre | ................................ | 604/8 |
| 5,864,272 A * | 1/1999 | Hoffmann | ..................... | 335/207 |
| 6,474,360 B1 * | 11/2002 | Ito | ................................. | 137/530 |
| 7,460,013 B1 | 12/2008 | Osborne et al. | | |
| 7,784,490 B1 * | 8/2010 | Stewart et al. | ................ | 137/556 |
| 7,994,886 B2 * | 8/2011 | Bedell | ........................... | 335/205 |
| 2003/0183792 A1 * | 10/2003 | Muraji | ..................... | 251/129.04 |
| 2009/0125024 A1 * | 5/2009 | Baur | ............................... | 606/42 |

FOREIGN PATENT DOCUMENTS

| | | |
|---|---|---|
| DE | 202005020753 | 7/2006 |
| DE | 102005011984 | 9/2006 |
| DE | 102007030405 | 10/2008 |
| FR | 2812926 | 2/2002 |
| WO | 2004099657 | 11/2004 |

OTHER PUBLICATIONS

DE 8235959.8, Nov. 24, 1983, Festo-Maschinenfabrik Gottlieb Stoll.*
German Search Report mailed May 25, 2010.
EP Search Report from EP10008949 dated Nov. 27, 2012.

* cited by examiner

*Primary Examiner* — Eric Keasel
*Assistant Examiner* — Seth W Mackay-Smith
(74) *Attorney, Agent, or Firm* — Carlson, Gaskey & Olds, PC

(57) ABSTRACT

A valve drive system has a valve drive device and a hand-operated apparatus to trigger control actions in the valve drive device. The hand-operated apparatus includes a magnet arrangement, and the valve drive device includes a magnetic field sensor arrangement adjusted to the magnet arrangement of the hand-operated apparatus.

20 Claims, 1 Drawing Sheet

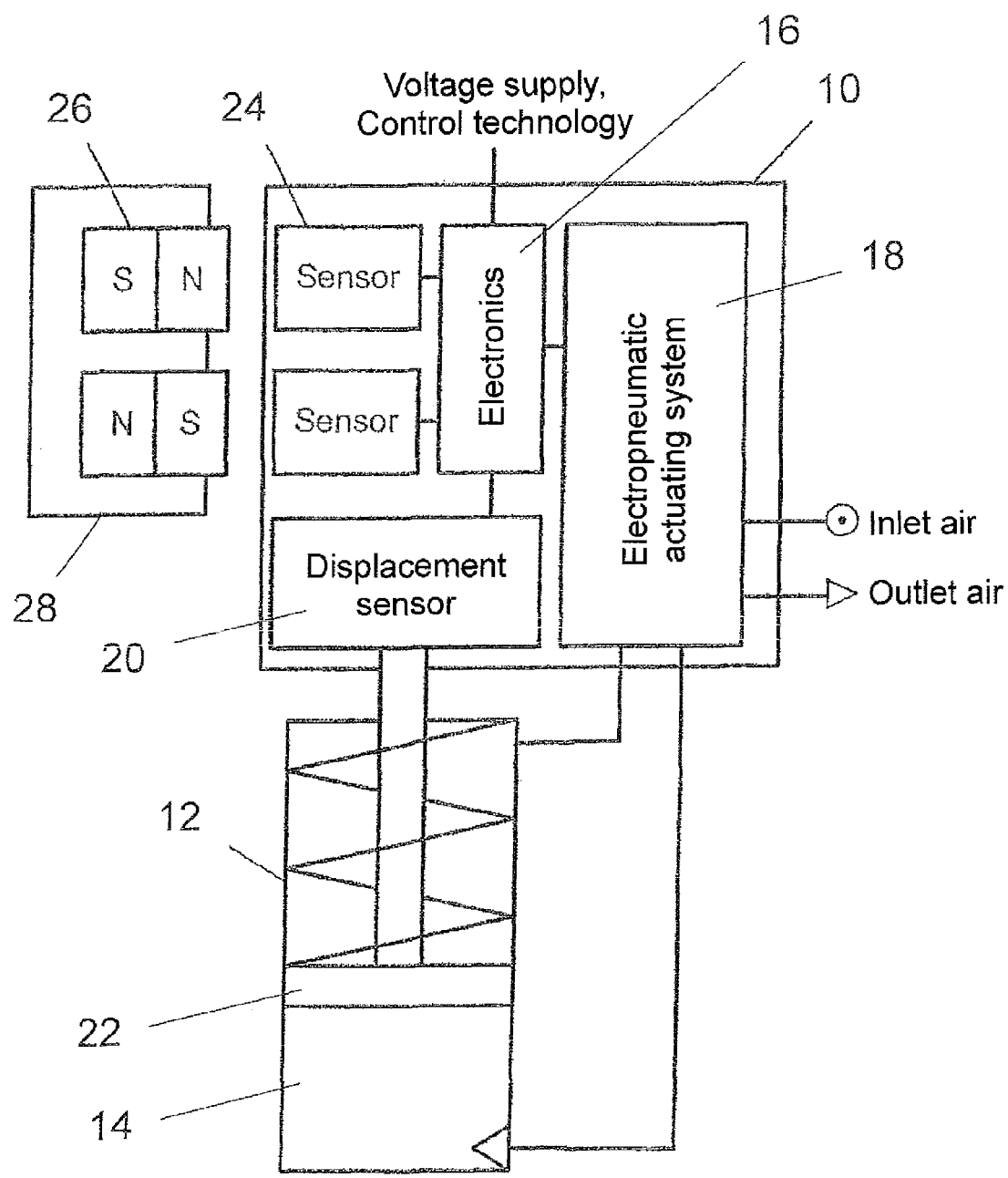

MANUALLY OPERABLE DRIVE MODULE

RELATED APPLICATION

This application claims priority to German Application No. 20 2009 012 183.6, which was filed Sep. 8, 2009.

BACKGROUND

The present invention relates to a valve drive system including a valve drive device and a hand-operated apparatus for triggering operating actions in the valve drive device.

Known solutions in the field of valve drives require either mechanical actuations by hand inside the valve drive device or complicated line-bound or wireless data transfer techniques (in particular radio and infrared are known in this area), or they are based on conventional possibilities of operation such as, e.g., the activation of keys which are covered by a front film.

Opening a housing or removing a housing part in order to reach the inside of a valve drive device is awkward and time-consuming. Considering the typically demanded high protection requirements, line-bound technologies are expensive. Wireless data transfer, e.g. via modems, is also too costly for most applications. A control using keys is not always found to be convenient and requires reliable and, hence, expensive control panels.

SUMMARY

One objective of the invention is to allow a reliable and convenient operation of a valve drive device.

A valve drive system includes a valve drive device and a hand-operated apparatus to trigger control actions in the valve drive device. The hand-operated apparatus includes a magnet arrangement, and the valve drive device includes a magnetic field sensor arrangement adjusted to the magnet arrangement of the hand-operated apparatus.

A magnetic field sensor arrangement adjusted to the magnet arrangement of the hand-operated apparatus here means a sensor arrangement which can register a magnetic field generated by the magnet arrangement when the magnet arrangement is in the vicinity of the magnetic field sensor arrangement.

The valve drive system allows a safe triggering of control actions within the valve drive device. Opening the housing of the valve drive device is required just as little as any cabling, plug connections or interfaces for a wireless data transfer. In addition, this system is virtually free of wear since the triggering of control actions takes place in a contactless manner. Handling is very comfortable, with no keys having to be pressed; it is only necessary to bring the hand-operated apparatus near the valve drive device and, if required, move the hand-operated apparatus. When realizing the magnetic field arrangement and the associated magnetic field sensor arrangement, use may be made of standard components to the greatest possible extent so that, in comparison with other technologies, the subject system is cost-effective.

The magnetic field sensor arrangement of the valve drive device is preferably designed to be sensitive to the field strength and/or the field direction of the magnetic field generated by the magnet arrangement.

Embodiments in which the magnetic field sensor arrangement includes at least two sensors and/or the magnet arrangement includes at least two permanent magnets are particularly advantageous. The use of two or more sensors and/or magnets allows a plurality of positions and/or movements of the hand-operated apparatus to be distinguished and assigned to different commands. In addition to this possibility of encoding control actions, the plurality of sensors and/or magnets also prevents any potential operating errors. Compared with the use of only one sensor and/or magnet, the probability of an occurrence of interference fields of the same type is markedly reduced owing to the locally very limited profile of the directional field strengths.

For distinguishing between the various positions and/or movements of the hand-operated apparatus, it is expedient that the magnetic field sensor arrangement generates characteristic signals as a function of the orientation and/or movement of the magnet arrangement relative to the magnetic field sensor arrangement.

The signals may then be assigned to different commands which are stored in a memory of an electronic control unit, for example. In this way, the requirements for the generation of different characteristic magnetic fields or changes in magnetic field to be recognized in the valve drive device and to result in the triggering of the respectively desired control action are satisfied in a simple manner.

A further development of the invention makes provision that the magnet arrangement includes at least one solenoid. The solenoid(s) may be provided as an alternative or in addition to one or more permanent magnets. The use of solenoids opens up a wide spectrum of operating and control options.

For instance, a solenoid control for the solenoid that allows the energization of the solenoid (ON/OFF, varying the current intensity, if required) and/or the current flow direction (setting the polarity of the solenoid) to be variable, may be made use of for generating many different magnetic fields.

Of particular advantage here is a time-variable solenoid control. Using such a solenoid control, previously defined sequences of magnetic fields/field changes may be generated using only one solenoid. The magnetic field sensor arrangement recognizes the profiles that are assigned to particular commands.

According to a further development of this aspect, such a time-variable solenoid control is can be used in part to transfer data into the valve drive device.

These and other features of the present invention can be best understood from the following specification and drawings, the following of which is a brief description.

BRIEF DESCRIPTION OF THE DRAWINGS

The invention will be described in detail below based on a preferred embodiment with reference to the accompanying drawing, in which the single FIGURE shows a schematic illustration of a valve drive system according to the invention.

DETAILED DESCRIPTION

As an example, the FIGURE illustrates a valve drive device 10 for driving a pneumatic actuator 12 having a pneumatic cylinder 14 for a process valve. Typical components of such a valve drive device 10 are a central electronics 16, an electropneumatic actuating system 18 and a displacement sensor 20 that determines the position of a piston 22 movable in the pneumatic cylinder 14.

But the invention is not limited to this type of valve drive device, but extends to all kinds of valve drive devices requiring control actions on specific occasions.

Furthermore, the valve drive device 10 comprises a magnetic field sensor arrangement 24 having two or more sensors which can register a change in the field strength and/or the field direction of a nearby magnetic field and supply corresponding signals. Sensors that are suitable for this purpose include, e.g., Hall sensors.

The magnetic field sensor arrangement 24 is protected against external (mechanical) influences by a plastic housing, which also accommodates the other components of the valve drive device 10. The plastic material does not significantly impair the sensitivity of the magnetic field sensor arrangement 24.

The magnetic field sensor arrangement 24 of the valve drive device 10 is adjusted to a magnet arrangement 26 of a hand-operated apparatus 28 which, together with the valve drive device 10, constitutes a valve drive system. The magnet arrangement 26 is received in a plastic housing of the hand-operated apparatus 28 and includes two or more strong permanent magnets.

The magnet arrangement 26 and the magnetic field sensor arrangement 24 are adjusted to each other, in particular in view of the magnetic field strength and the sensor sensitivity as well as with regard to the geometric arrangement of the permanent magnets and the sensors. As a result, any influence of interference fields is practically ruled out.

The functioning of the valve drive system will now be explained below. With the aid of the hand-operated apparatus 28, control actions can be triggered within the valve drive device 10. To this end, the hand-operated apparatus 28 with the magnet arrangement 26 is moved close to the magnetic field sensor arrangement 24, as shown in the Figure, so that the sensors of the magnetic field sensor arrangement 24 can register the presence of and/or the change in the magnetic fields generated by the permanent magnets of the magnet arrangement 26 (field strength and field direction).

Depending on the orientation and/or movement (specifically the direction of movement) of the permanent magnets of the magnet arrangement 26 relative to the sensors of the magnetic field sensor arrangement 24, the magnetic field sensor arrangement 24 generates a signal characteristic of the respective orientation and/or movement. In this way, it is possible to use the hand-operated apparatus 28 to generate various signals in the valve drive device 10 in a contactless manner, which are assigned to different commands defined in the electronics 16 (coding). The commands constitute triggers for corresponding control actions in the valve drive device 10.

The magnet arrangement 26 may also include one or more specially shaped permanent magnets. "Specially shaped" in this connection is intended to mean shapes which differ from the typical linear basic shape of a permanent magnet (bar magnet).

The number of distinguishable signals or commands generally varies with the number of the magnets and sensors provided and the arrangement thereof.

In place of permanent magnets, provision may also be made for one or a plurality of solenoids. A solenoid control of the solenoids that allows the energization and/or the current flow direction (and, hence, the polarity of the solenoid(s)) to be varied increases the number of possible command codes. A suitable variation of the solenoid control in terms of time allows even larger amounts of data to be sequentially transferred to the valve drive device 10 in a wireless and contactless manner.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A valve drive system comprising:
   a valve drive device having a pneumatic actuator including a pneumatic cylinder and a piston moveable within the cylinder;
   a hand-operated apparatus to trigger control actions in the valve drive device, wherein the hand-operated apparatus includes a magnet arrangement, and wherein a magnetic field generated by the magnet arrangement in the hand-operated apparatus triggers the control actions in the valve drive device in a contactless manner;
   wherein the valve drive device includes a magnetic field sensor arrangement located within a housing of the valve drive device and adjusted to the magnet arrangement of the hand-operated apparatus; and
   wherein the hand-operated apparatus causes signals to be generated in the valve drive device, with each signal having an associated valve command to trigger a corresponding operation of the valve drive device.

2. The valve drive system according to claim 1, wherein the magnetic field sensor arrangement is sensitive to a field strength and/or a field direction of a magnetic field generated by the magnet arrangement.

3. The valve drive system according to claim 1, wherein the magnetic field sensor arrangement includes at least two sensors and/or the magnet arrangement includes at least two permanent magnets.

4. The valve drive system according to claim 1 wherein the magnetic field sensor arrangement generates characteristic signals as a function of an orientation and/or movement of the magnet arrangement relative to the magnetic field sensor arrangement.

5. The valve drive system according to claim 4, wherein the characteristic signals are assigned to different commands.

6. The valve drive system according to claim 1 wherein the magnet arrangement includes at least one solenoid.

7. The valve drive system according to claim 6, wherein a solenoid control is provided for the solenoid to allow energization of the solenoid and/or a current flow direction to be variable.

8. The valve drive system according to claim 7, wherein the solenoid control is time-variable.

9. The valve drive system according to claim 8, wherein the solenoid control is used in part to transfer data into the valve drive device.

10. The valve drive system according to claim 1, wherein the hand-operated apparatus comprises a hand held unit that is independently moveable relative to the valve drive device.

11. The valve drive system according to claim 1, wherein positioning of the hand-operated apparatus near the valve drive device initiates generation of the signals.

12. The valve drive system according to claim 1, wherein the valve drive device includes a central electronics located within the housing and wherein the signals are assigned to different commands defined in the electronics such that the commands constitute triggers for corresponding control actions in the valve drive device.

13. The valve drive system according to claim 12, wherein the housing of the valve drive device comprises a first housing, and wherein the hand-operated apparatus includes a second housing that is separate from the first housing.

14. The valve drive system according to claim 12, wherein the valve drive device includes a displacement sensor to determine a position of the piston in the cylinder, the displacement sensor communicating the position to the central electronics.

15. The valve drive system according to claim 14, including a electropnuematic actuating system in communication with the central electronics and the pneumatic actuator, and wherein the displacement sensor, the central electronics, and the electropnuematic actuating system are located within the housing of the valve drive device.

16. The valve drive system according to claim 1, wherein the magnetic field sensor arrangement registers a change in field strength and/or field direction of the magnetic field in a contactless manner.

17. A valve drive system comprising:
a valve drive device having a first housing associated with a pneumatic actuator that includes a pneumatic cylinder and a piston moveable within the cylinder;
a hand-operated apparatus to communicate with the valve drive device in a contactless manner, wherein the hand-operated apparatus includes a magnet arrangement received within a second housing that is separate from the first housing;
wherein the valve drive device includes a magnetic field sensor arrangement located within the first housing, the magnetic field sensor arrangement being responsive to the magnet arrangement of the hand-operated apparatus in a contactless manner; and
wherein the interaction between the magnetic arrangement and the magnetic field senor arrangement causes signals to be generated in the valve drive device, with each signal having an associated valve command to trigger a corresponding operation of the valve drive device.

18. The valve drive system according to claim 17 wherein the magnetic field sensor arrangement generates characteristic signals as a function of an orientation and/or movement of the magnet arrangement relative to the magnetic field sensor arrangement.

19. The valve drive system according to claim 18, wherein the characteristic signals are assigned to different commands.

20. The valve drive system according to claim 17, wherein the valve drive device includes a central electronics located within the housing and wherein the signals are assigned to different commands defined in the electronics such that the commands constitute triggers for corresponding control actions in the valve drive device.

* * * * *

UNITED STATES PATENT AND TRADEMARK OFFICE
CERTIFICATE OF CORRECTION

PATENT NO. : 8,622,366 B2
APPLICATION NO. : 12/877151
DATED : January 7, 2014
INVENTOR(S) : Bachmann et al.

It is certified that error appears in the above-identified patent and that said Letters Patent is hereby corrected as shown below:

IN THE CLAIMS:

Claim 17, column 6, line 4: "senor" should read as --sensor--

Signed and Sealed this
Thirteenth Day of May, 2014

Michelle K. Lee
*Deputy Director of the United States Patent and Trademark Office*